United States Patent
Zhou

(10) Patent No.: US 11,356,139 B2
(45) Date of Patent: Jun. 7, 2022

(54) INTERFERENCE COORDINATION METHOD AND APPARATUS, BASE STATION, AND USER EQUIPMENT

(71) Applicant: Beijing Xiaomi Mobile Software Co., Ltd., Beijing (CN)

(72) Inventor: Juejia Zhou, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 270 days.

(21) Appl. No.: 16/626,597

(22) PCT Filed: Jul. 7, 2017

(86) PCT No.: PCT/CN2017/092176
§ 371 (c)(1),
(2) Date: Dec. 26, 2019

(87) PCT Pub. No.: WO2019/006736
PCT Pub. Date: Jan. 10, 2019

(65) Prior Publication Data
US 2020/0119764 A1 Apr. 16, 2020

(51) Int. Cl.
*H04B 1/525* (2015.01)
*H04W 72/12* (2009.01)

(52) U.S. Cl.
CPC ........ *H04B 1/525* (2013.01); *H04W 72/1205* (2013.01)

(58) Field of Classification Search
None
See application file for complete search history.

(56) References Cited

U.S. PATENT DOCUMENTS 6,450,717 B1 * 9/2002 Salz ............... A61C 3/005
401/125
8,817,641 B2 * 8/2014 Choi ............... H04W 16/14
455/115.2
(Continued)

FOREIGN PATENT DOCUMENTS

CN 102143499 A 8/2011
CN 102546074 A 7/2012
(Continued)

OTHER PUBLICATIONS

First Office Action of Indian Application No. 201927053725 dated May 28, 2021.
(Continued)

*Primary Examiner* — Tuan A Tran
(74) *Attorney, Agent, or Firm* — Finnegan, Henderson, Farabow, Garrett & Dunner, L.L.P.

(57) ABSTRACT

The present disclosure relates to an interference coordination method and apparatus, a base station, user equipment, and a computer readable storage medium. The interference coordination method includes: determining whether intra-device interference exists between uplink transmission and downlink transmission of user equipment (UE) in two frequency bands; and if it is determined that intra-device interference exists between the uplink transmission and downlink transmission of the UE in two frequency bands, stopping sending downlink transmission scheduling information of one frequency band to the UE in a time interval during which the UE is scheduled to send uplink transmission in at least one frequency band of the two frequency bands; or, sending a blank subframe or an almost blank subframe to the UE in a time interval in which the UE is scheduled to send uplink transmission in at least one frequency band of the two frequency bands; or stopping sending the uplink transmission scheduling information of at (Continued)

least one frequency band in the two frequency bands to the UE in a time interval of sending downlink transmission scheduling information of one frequency band to the UE. By means of the embodiments of the present invention, the objective for avoiding data channel interference in a device can be achieved.

12 Claims, 8 Drawing Sheets

(56) References Cited

U.S. PATENT DOCUMENTS

| | | | | |
|---|---|---|---|---|
| 8,824,968 | B2* | 9/2014 | Kim | H04B 17/327 455/442 |
| 8,831,655 | B2* | 9/2014 | Burchill | H04W 16/14 370/338 |
| 8,913,528 | B2* | 12/2014 | Cheng | H04L 5/0062 370/278 |
| 9,008,675 | B2* | 4/2015 | Seo | H04W 74/006 455/418 |
| 9,025,478 | B2* | 5/2015 | Jung | H04W 72/082 370/252 |
| 9,271,291 | B2* | 2/2016 | Gauvreau | H04L 5/001 |
| 9,450,694 | B1* | 9/2016 | Jung | H04L 5/0007 |
| 9,456,360 | B2* | 9/2016 | Lagen Morancho | H04B 7/0426 |
| 9,635,584 | B2* | 4/2017 | Choi | H04B 7/2656 |
| 9,692,566 | B2* | 6/2017 | Gu | H04L 5/0032 |
| 9,787,420 | B2* | 10/2017 | Wu | H04W 76/27 |
| 9,888,487 | B2* | 2/2018 | Hu | H04W 24/08 |
| 10,142,987 | B2* | 11/2018 | Choi | H04W 72/0406 |
| 10,153,889 | B2* | 12/2018 | Cheng | H04L 5/0007 |
| 10,306,562 | B2* | 5/2019 | Jain | H04W 52/367 |
| 10,470,200 | B2* | 11/2019 | Gheorghiu | H04W 72/048 |
| 2009/0031201 | A1 | 12/2009 | Hall | |
| 2010/0093364 | A1 | 4/2010 | Ribeiro et al. | |
| 2010/0098135 | A1 | 4/2010 | Eitan | |
| 2012/0184206 | A1* | 7/2012 | Kim | H04W 52/243 455/11.1 |
| 2012/0213162 | A1 | 8/2012 | Koo et al. | |
| 2013/0322260 | A1 | 12/2013 | Yao et al. | |
| 2014/0274105 | A1* | 9/2014 | Wang | H04W 52/244 455/454 |
| 2014/0376398 | A1* | 12/2014 | Li | H04W 24/08 370/252 |
| 2016/0269094 | A1* | 9/2016 | Kim | H04L 5/14 |
| 2016/0302209 | A1 | 10/2016 | Behravan et al. | |
| 2016/0353343 | A1 | 12/2016 | Rahman et al. | |

FOREIGN PATENT DOCUMENTS

| | | |
|---|---|---|
| CN | 102595465 A | 7/2012 |
| CN | 107466487 A | 12/2017 |
| RU | 2320085 C2 | 3/2008 |
| RU | 2563589 C2 | 9/2015 |
| RU | 2565247 C1 | 10/2015 |
| RU | 2584141 C2 | 5/2016 |
| RU | 2619918 C1 | 5/2017 |

OTHER PUBLICATIONS

Notice of Allowance for Korean Application No. 10-2019-7026495, dated Apr. 27, 2021.
3GPP TR 38.912 V14.0.0 (Mar. 2017); 3rd Generation Partnership Project; Technical Specification Group Radio Access Network; Study on New Radio (NR) access technology (Release 14); 74 pages.
Office Action of Korean Application No. 10-2019-7026495 dated Oct. 21, 2020.
Qualcomm Incorporated, Convida Wireless, Concurrent RAT operation with NR, 3GPP TSG-RAN2#94, R2-164092, Nanjing, China, May 23-27, 2016, 3 pages.
Skyworks Solutions, Inc., Discussion on UE to UE and in-device co-existence between mmW NR and sub-6GHz NR and LTE, 3GPP TSG-RAN WG4 Meeting #81, R4-1609237, Reno, Nevada, Nov. 14-18, 2016, 10 pages.
Qualcomm Incorporated, Slice Isolation in RAN, 3GPP TSG-RAN WG3 Meeting #94, R3-162828, Reno, Nevada, Nov. 14-18, 2016, 4 pages.
Samsung, Way Forward on TDM Operation across Different RATs, 3GPP TSG-RAN WG2 Meeting #97, R2-1701297, Athens, Greece, Feb. 13-17, 2017, 4 pages.
English version of International Search Report of counterpart PCT Application No. PCT/CN2017/092176 from the State Intellectual Property Office of the P.R. China, Beijing, China, dated Apr. 3, 2018.
Intel Corporation (UK) Ltd., TDM Solutions for In-Device Coexistence, 3GPP TSG-RAN WG2 #71 bis, R2-105666, Xi'an, China, Oct. 11-15, 2010, 4 pgs.
Office Action of Russian Application No. 2020100854/07 dated Jun. 23, 2020.
Huawei, HiSilicon, Coexistence of NR DL and LTE, 3GPP TSG RAN WG1 Meeting #88bis, R1-1704198, Spokane, USA, Apr. 3-7, 2017, 7 pages.
Huawei, HiSilicon, Overview of NR UL for LTE-NR coexistence, 3GPP TSG RAN WG1 Meeting #89, R1-1706905, Hangzhou, China, May 15-19, 2017, 13 pages.

* cited by examiner

INTERFERENCE COORDINATION METHOD AND APPARATUS, BASE STATION, AND USER EQUIPMENT

CROSS REFERENCE TO RELATED APPLICATIONS

This application is a national phase application based on PCT/CN20171/092176, filed Jul. 7, 2017, the content of which is incorporated herein by reference.

TECHNICAL FIELD

The present disclosure relates to the field of communication technology, in particular to an interference coordination method and apparatus, a base station, user equipment, and a computer readable storage medium.

BACKGROUND

With the rapid development of wireless communication technology, the fifth generation mobile communication technology (5th Generation, referred to as 5G) has emerged. In the early stage of the 5G layout, a non-standalone (NSA) manner will be used for network deployment, that is, long term evolution (LTE) serves as the main coverage, and the new radio (NR) serves as a powerful supplement to the data transmission service, forming the LTE-NR interworking layout. In this way, the existing network coverage advantage of the LTE can be fully utilized, and the transition to 5G NR can be gradually made, thereby making the network transition smoother and more stable.

The popular frequency bands of NR are 3.4-4.2 GHZ, 4.99 GHZ and 24 GHz and other frequency bands. Among them, 3.4 GHz in the low frequency band is particularly valued, and many operators will preferentially deploy 5G NR in the frequency of 3.4 GHz-3.6 GHz.

LTE has a large number of frequencies operating in the range of 1.7 GHz to 1.8 GHz, such as the mainstream Frequency Division Dual (FDD) band (Band) 3 and so on.

The user equipment (UE) can work in one frequency band of LTE and one frequency band of NR simultaneously, and can also work in two frequency bands of NR. When the two bands are interoperable, there may be mutual interference between the uplink and downlink transmissions of the two bands. At present, the problem of mutual interference is solved by avoiding the concurrency of two frequency bands, that is, by activating either one frequency band or the other frequency band. However, this method requires frequent activation of different frequency bands, wasting UE resources and affecting user experience.

SUMMARY

In view of this, the present invention discloses an interference coordination method and apparatus, a base station, user equipment, and a computer readable storage medium, so as to solve the interference problem in the data channel of uplink and downlink transmission in two frequency bands in user equipment.

According to a first aspect of the embodiments of the present disclosure, there is provided an interference coordination method, the method comprising:

determining whether intra-device interference exists between uplink transmission and downlink transmission of user equipment (UE) in two frequency bands;

if it is determined that intra-device interference exists between the uplink transmission and downlink transmission of the UE in two frequency bands, then stopping sending downlink transmission scheduling information of one frequency band to the UE or sending a blank subframe or an almost blank subframe to the UE in a time interval during which the UE is scheduled to send uplink transmission in at least one frequency band of the two frequency bands; or stopping sending the uplink transmission scheduling information of at least one frequency band in the two frequency bands to the UE in a time interval of sending downlink transmission scheduling information of one frequency band to the UE.

According to a second aspect of the embodiments of the present disclosure, there is provided an interference coordination method, the method comprising:

receiving the configuration information sent by the base station, wherein the configuration information is sent after the base station determines that the harmonic interference exists between the uplink transmission of the UE in the first frequency band and the downlink transmission of the UE in the second frequency band or that the intermodulation interference exists between the uplink transmission of the UE in the first frequency band and in the second frequency band and the downlink transmission in the first frequency band of the UE simultaneously;

enabling the interference coordination function according to the configuration information.

According to a third aspect of the embodiments of the present disclosure, there is provided a base station, which comprises:

a processor:

a memory, used for storing processor executable instructions;

wherein the processor is configured to:

determine whether intra-device interference exists between uplink transmission and downlink transmission of user equipment (UE) in two frequency bands:

if it is determined that intra-device interference exists between the uplink transmission and downlink transmission of the UE in two frequency bands, then stop sending downlink transmission scheduling information of one frequency band to the UE, or send a blank subframe or an almost blank subframe to the UE, in a time interval during which the UE is scheduled to send uplink transmission in at least one frequency band of the two frequency bands; or stop sending the uplink transmission scheduling information of at least one frequency band in the two frequency bands to the UE in a time interval of sending downlink transmission scheduling information of one frequency band to the UE.

According to a fourth aspect of the embodiments of the present disclosure, there is provided user equipment, which comprises:

a processor;

a memory, used for storing processor executable instructions:

wherein the processor is configured to:

receive the configuration information sent by the base station, wherein the configuration information is sent after the base station determines that the harmonic interference exists between the uplink transmission of the UE in the first frequency band and the downlink transmission of the UE in the second frequency band or that the intermodulation interference exists between the uplink transmission of the UE in the first frequency band and in the second frequency band and the downlink transmission in the first frequency band of the UE simultaneously;

enable the interference coordination function according to the configuration information.

It should be understood that the above general description and the following detailed description are merely exemplary and explanatory, which cannot limit to t

BRIEF DESCRIPTION OF THE DRAWINGS

The attached drawings herein are incorporated into the specification and form part of the specification, showing embodiments consistent with the invention and used together with the specification to explain the principles of the invention.

DETAILED DESCRIPTION

Exemplary embodiments will be described in detail herein, examples of which are illustrated in the accompanying drawings. The following description refers to the same or similar elements in the different figures unless otherwise indicated. The embodiments described in the following exemplary embodiments do not represent all embodiments consistent with the present invention. Instead, they are merely examples of devices and methods consistent with aspects of the invention as detailed in the appended claims.

Figure 1:
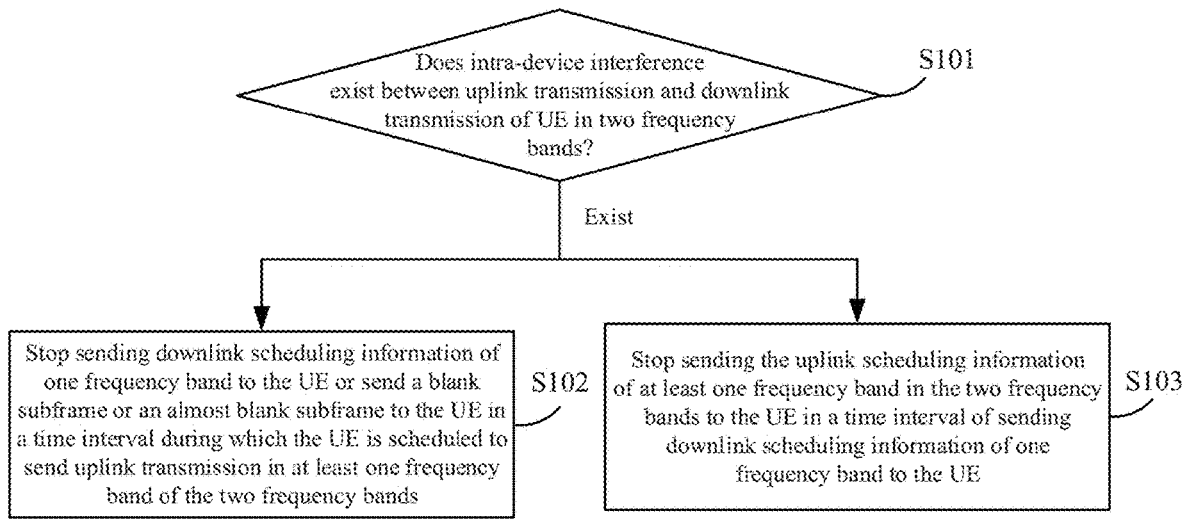
FIG. 1 is a flowchart of an interference coordination method according to an exemplary embodiment of the present application.

FIG. 1 is a flowchart of an interference coordination method according to an exemplary embodiment of the present application, and the embodiment is described from a base station side. As shown in FIG. 1, the interference coordination method comprises:

In step S101, determining whether intra-device interference exists between the uplink transmission and downlink transmission of user equipment (UE) in two frequency bands, and performing step S102 or step S103, if it is determined that intra-device interference exists between the uplink transmission and downlink transmission of the UE in two frequency bands.

In this embodiment, the base station may determine, according to the information of the UE accessing the network, whether intra-device interference exists between the uplink transmission and downlink transmission of the UE in the two frequency bands, wherein the intra-device interference may comprise harmonic interference and inter-modulation interference.

When an integer multiple of one frequency band at least partially overlaps another frequency band, harmonic interference may occur between the uplink transmission and downlink transmission of the two frequency bands.

Intermodulation interference (IM interference) refers to that, when two or more interfering signals are simultaneously applied to the receiver, due to the nonlinear effect, the combined frequency of the two interferences will sometimes be exactly equal to or close to the useful signal frequency and pass through the receiver smoothly, forming the interference.

In step S102, stopping sending downlink transmission scheduling information of one frequency band to the UE, or sending a blank subframe or an almost blank subframe to the UE, in a time interval during which the UE is scheduled to send uplink transmission in at least one frequency band of the two frequency bands.

In this embodiment, if the base station determines that the intra-device interference exists between the uplink transmission and downlink transmission of the UE in two frequency bands, for example, the harmonic interference or intermodulation interference, the base station may stop sending downlink transmission scheduling information of one frequency band to the UE in a time interval during which the UE is scheduled to send uplink transmission in at least one frequency band of the two frequency bands, or send a blank subframe or an almost blank subframe to the UE in a time interval in which the UE is scheduled to send uplink transmission in at least one frequency band of the two frequency bands.

Wherein, the blank subframe is a subframe without any information transmission. The almost blank subframe (abbreviated as ABS) is a type of subframe that contains control information and reference signals and does not contain data information.

In step S103, stopping sending the uplink transmission scheduling information of at least one frequency band in the two frequency bands to the UE in a time interval of sending downlink transmission scheduling information of one frequency band to the UE.

In this embodiment, if the base station determines that intra-device interference exists between the uplink transmission and downlink transmission of the UE in two frequency bands, for example, the harmonic interference or intermodulation interference, then the base station may stop sending the uplink transmission scheduling information of at least one frequency band in the two frequency bands to the UE in a time interval of sending downlink transmission scheduling information of one frequency band to the UE.

In the foregoing embodiment, after determining that intra-device interference exists between the uplink transmission and downlink transmission of the UE in two frequency bands, the objective for avoiding data channel interference in a device can be achieved by stopping sending downlink transmission scheduling information of one frequency band to the UE in a time interval during which the UE is scheduled to send uplink transmission in at least one frequency band of the two frequency bands, or sending a blank subframe or an almost blank subframe to the UE in a time interval during which the UE is scheduled to send uplink transmission in at least one frequency band of the two frequency bands, or by stopping sending the uplink transmission scheduling information of at least one frequency band in the two frequency bands to the UE in a time interval of sending downlink transmission scheduling information of one frequency band to the UE.

Figure 2A:
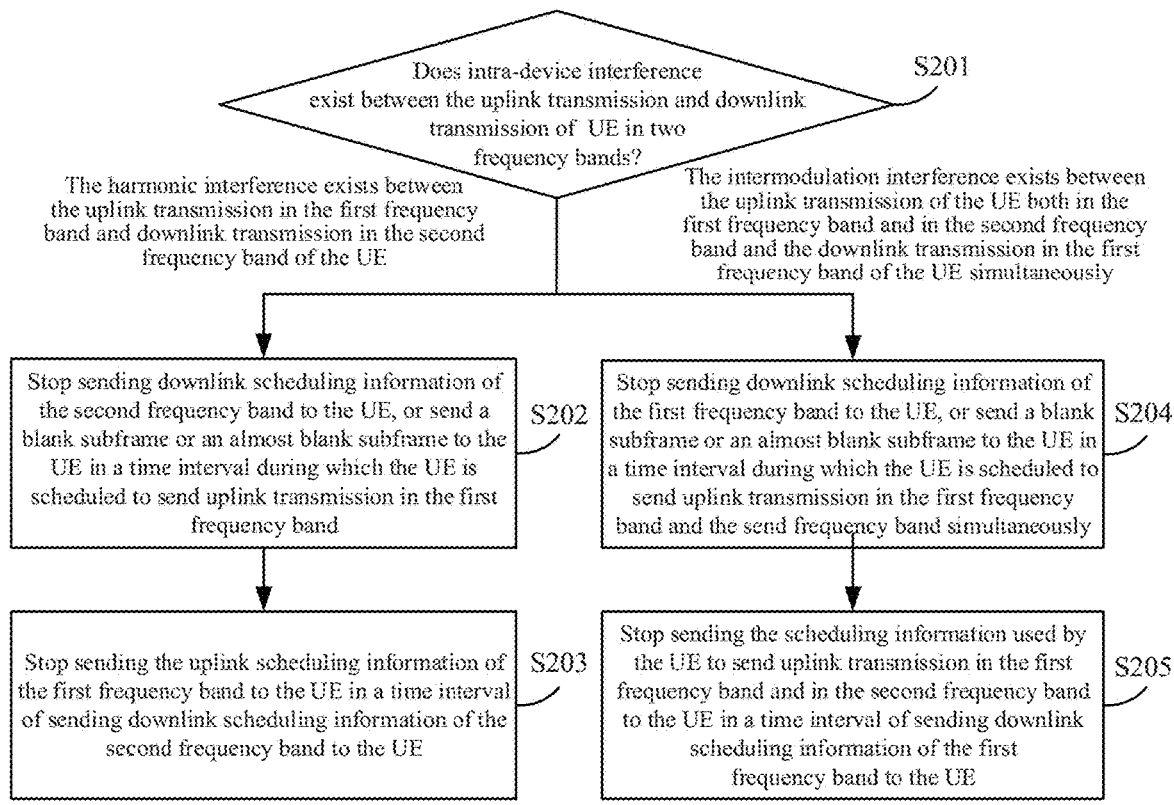
FIG. 2A is a flowchart of another interference coordination method according to an exemplary embodiment of the present application.

FIG. 2A is a flowchart of another interference coordination method according to an exemplary embodiment of the present application. The embodiment is described from a base station side. As shown in FIG. 2A, the interference coordination method comprises:

In step S201, determining whether intra-device interference exists between the uplink transmission and downlink transmission of user equipment (UE) in two frequency bands, and then performing the step S202 or step S203, if it is determined that harmonic interference exists between the uplink transmission in the first frequency band and downlink transmission in the second frequency band of the UE, or performing the step S204 or step S205, if it is determined that intermodulation interference exists between the uplink transmission of the UE both in the first frequency band and in the second frequency band and the downlink transmission in the first frequency band of the UE simultaneously.

In this embodiment, the base station may determine, according to the information of the UE accessing the network, whether the harmonic interference or intermodulation interference exists between the uplink transmission and downlink transmission of the UE in the two frequency bands. In order to improve the accuracy of the determining, it is also possible to receive the interference withstand capability information reported by the UE at first, and then determine whether the harmonic interference or the intermodulation interference exists between the uplink transmission and downlink transmission of the UE in the two frequency bands according to the interference withstand capability information and the information of the UE accessing the network.

Wherein, the first frequency band may belong to the LTE frequency band, and the second frequency band may belong to the NR frequency band. In addition, the first frequency band and the second frequency band may also belong to two frequency bands in the NR.

Figure 2B:
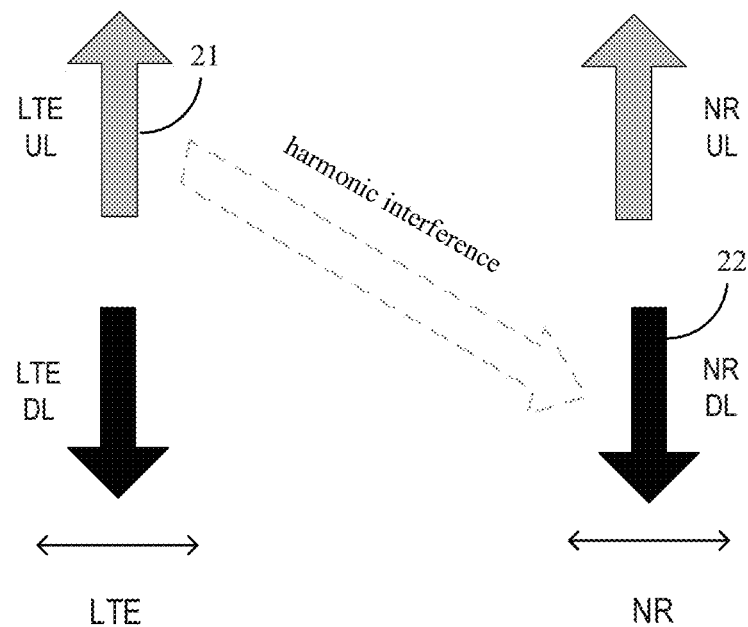
FIG. 2B is a schematic diagram showing two frequency bands in which harmonic interference is present, according to an exemplary embodiment of the present application.
Figure 2C:
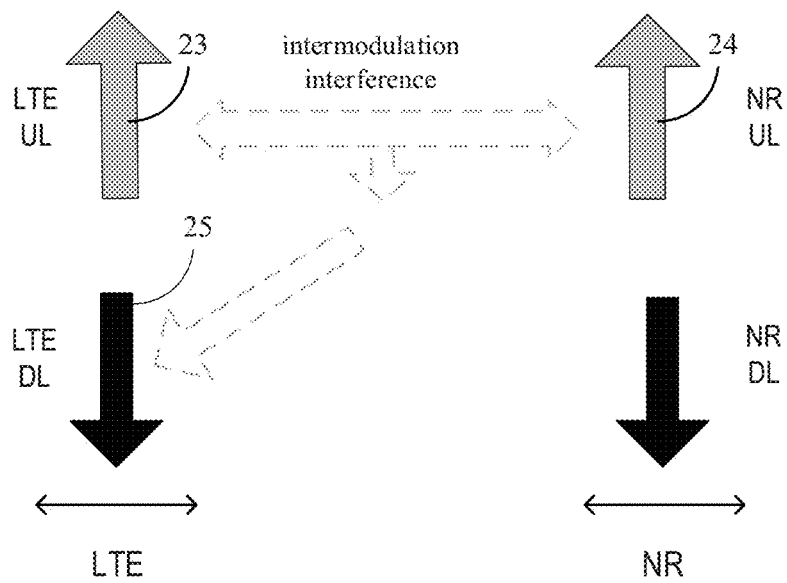
FIG. 2C is a schematic diagram showing two frequency bands in which harmonic interference is present, according to an exemplary embodiment of the present application.

Assume that the first frequency band is the LTE frequency band and the second frequency band is the NR frequency band. As shown in FIG. 2B, the harmonic interference exists in the uplink transmission (UL) 21 of the UE in the LTE frequency band and the downlink transmission (DL) 22 of the UE in the NR frequency band. As shown in FIG. 2C, the intermodulation interference exists between the uplink transmission 24 of the UE in the LTE frequency band and the uplink transmission 25 of the UE in the NR frequency band and the downlink transmission 26 of the UE in the LTE frequency band simultaneously.

In step S202, stopping sending downlink transmission scheduling information of the second frequency band to the UE, or sending a blank subframe or an almost blank subframe to the UE, in a time interval during which the UE is scheduled to send uplink transmission in the first frequency band.

In this embodiment, after the base station determines that the harmonic interference exists between the uplink transmission of the UE in the first frequency band and the downlink transmission of the UE in the second frequency band, the base station may stop sending downlink transmission scheduling information of the second frequency band to the UE in a time interval during which the UE is scheduled to send uplink transmission in the first frequency band, or send a blank subframe or an almost blank subframe to the UE in a time interval in which the UE is scheduled to send uplink transmission of the first frequency band.

As shown in FIG. 2B, after the base station determines that the harmonic interference exists between the uplink transmission of the UE in the LTE frequency band and the downlink transmission of the UE in the NR frequency band, the base station may stop sending downlink transmission scheduling information of the NR frequency band to the UE in a time interval during which the UE is scheduled to send uplink transmission in the LTE frequency band, or send a blank subframe or an almost blank subframe to the UE in a time interval in which the UE is scheduled to send uplink transmission of the LTE frequency band, so as to avoid the harmonic interference.

In step S203, stopping sending the uplink transmission scheduling information of the first frequency band to the UE in a time interval of sending downlink transmission scheduling information of the second frequency band to the UE.

In this embodiment, after the base station determines that the harmonic interference exists between the uplink transmission of the UE in the first frequency band and the downlink transmission of the UE in the second frequency band, the base station may stop sending the uplink transmission scheduling information of the first frequency band to the UE in a time interval of sending downlink transmission scheduling information of the second frequency band to the UE.

As shown in FIG. 2B, after the base station determines that the harmonic interference exists between the uplink transmission of the UE in the LTE frequency band and the downlink transmission of the UE in the NR frequency band, the base station may stop sending the uplink transmission scheduling information of the LTE frequency band to the UE in a time interval of sending downlink transmission scheduling information of the NR frequency band to the UE, so as to avoid the harmonic interference.

In this embodiment, if the base station receives the scheduling request for the uplink transmission in the first frequency band that is sent by the UE, then the base station may send the uplink transmission scheduling information of the first frequency band to the UE, after sending the downlink transmission scheduling information of the second frequency band to the UE, so as to realize the effect that the base station stops sending the uplink transmission scheduling information of the first frequency band to the UE in the time interval of sending the downlink transmission scheduling information of the second frequency band to the UE.

In step S204, stopping sending downlink transmission scheduling information of the first frequency band to the UE, or sending a blank subframe or an almost blank subframe to the UE, in a time interval during which the UE is scheduled to send uplink transmission in the first frequency band and the send frequency band simultaneously.

In this embodiment, after the base station determines that the intermodulation interference exists between the uplink transmission of the UE both in the first frequency band and in the second frequency band and the downlink transmission of the UE in the first frequency band simultaneously, the base station may stop sending downlink transmission scheduling information of the first frequency band to the UE or sending a blank subframe or an almost blank subframe to the UE in a time interval during which the UE is scheduled to send uplink transmission in the first frequency band and in the second frequency band simultaneously, so as to avoid the intermodulation interference.

As shown in FIG. 2C, after the base station determines that the intermodulation interference exists between the uplink transmission of the UE both in the LTE frequency band and in the NR frequency band and the downlink transmission of the UE in the LTE frequency band simultaneously, the base station may stop sending downlink transmission scheduling information of the LTE frequency band to the UE in a time interval during which the UE is scheduled to send uplink transmission in the LTE frequency band and in the NR frequency band, or send a blank subframe or an almost blank subframe to the UE in a time interval in which the UE is scheduled to send uplink transmission of the LTE frequency band and the NR frequency band simultaneously, so as to avoid the intermodulation interference.

In step S205, stopping sending the scheduling information used by the UE to send uplink transmission in the first frequency band and in the second frequency band to the UE in a time interval of sending downlink transmission scheduling information of the first frequency band to the UE.

In this embodiment, after the base station determines that the intermodulation interference exists between the uplink transmission of the UE both in the first frequency band and in the second frequency band simultaneously and the downlink transmission of the UE in the first frequency band, the base station may stop sending the scheduling information used by the UE to send uplink transmission in the first frequency band and in the second frequency band to the UE simultaneously in a time interval of sending downlink transmission scheduling information of the first frequency band to the UE, so as to avoid the intermodulation interference.

As shown in FIG. 2C, after the base station determines that the intermodulation interference exists between the uplink transmission of the UE both in the LTE frequency band and in the NR frequency band simultaneously and the downlink transmission of the UE in the LTE frequency band, the base station may stop sending the scheduling information used by the UE to send uplink transmission in the LTE frequency band and in the NR frequency band to the UE simultaneously in a time interval of sending downlink transmission scheduling information of the LTE frequency band to the UE, so as to avoid the intermodulation interference.

In this embodiment, if the base station receives the scheduling request for the uplink transmission in the first frequency band and in the second frequency band that is sent by the UE, then the base station may send the uplink transmission scheduling information of the first frequency band and the second frequency band to the UE, after sending the downlink transmission scheduling information of the first frequency band to the UE, so as to realize the effect that the base station stops sending the scheduling information used by the UE to send uplink transmission in the first frequency band and in the second frequency band to the UE simultaneously in a time interval of sending downlink transmission scheduling information of the first frequency band to the UE.

In the above embodiment, after the base station determines that the harmonic interference exists between the uplink transmission of the UE in the first frequency band and the downlink transmission of the UE in the second frequency band, the base station may stop sending downlink transmission scheduling information of the second frequency band to the UE in a time interval during which the UE is scheduled to send uplink transmission in the first frequency band, or sending a blank subframe or an almost blank subframe to the UE in a time interval in which the UE is scheduled to send uplink transmission in the first frequency band, or stopping sending the uplink transmission scheduling information of the first frequency band to the UE in a time interval of sending downlink transmission scheduling information of the second frequency band to the UE, so as to achieve the object for avoiding harmonic interference by utilizing coordinated scheduling between uplink and downlink transmissions; At the same time, after the base station determines that the intermodulation interference exists between the uplink transmission of the UE both in the first frequency band and in the second frequency band and the downlink transmission of the UE in the first frequency band simultaneously, the base station may stop sending downlink transmission scheduling information of the first frequency band to the UE in a time interval during which the UE is scheduled to send uplink transmission in the first frequency band and in the second frequency band simultaneously, or sending a blank subframe or an almost blank subframe to the UE in a time interval in which the UE is scheduled to send uplink transmission in the first frequency band and in the second frequency band simultaneously, or stopping sending the uplink transmission scheduling information of the first frequency band and the second frequency band to the UE in a time interval of sending downlink transmission scheduling information of the first frequency band to the UE, so as to achieve the object for avoiding intermodulation interference by utilizing coordinated scheduling between uplink and downlink transmissions.

Figure 3:
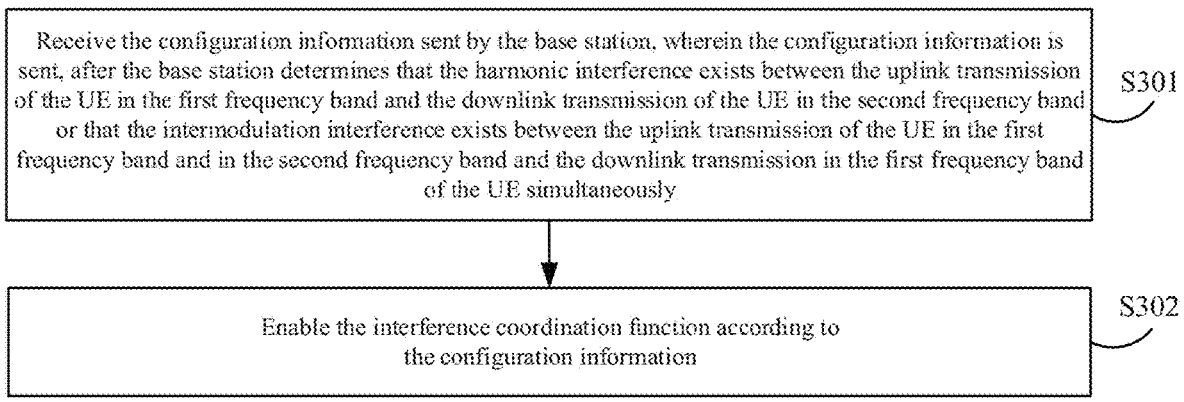
FIG. 3 is a flowchart of still another interference coordination method according to an exemplary embodiment of the present application; FIG.

FIG. 3 is a flowchart of still another interference coordination method according to an exemplary embodiment of the present application. The embodiment is described from the UE side. As shown in FIG. 3, the interference coordination method comprises:

In step S301, configuration information sent by the base station is received, wherein the configuration information is sent after the base station determines that the harmonic interference exists between the uplink transmission of the UE in the first frequency band and the downlink transmission of the UE in the second frequency band or that the intermodulation interference exists between the uplink transmission of the UE in the first frequency band and in the second frequency band and the downlink transmission in the first frequency band of the UE simultaneously.

In this embodiment, after the base station determines that the harmonic interference exists between the uplink transmission of the UE in the first frequency band and the downlink transmission of the UE in the second frequency band or that the intermodulation interference exists between the uplink transmission of the UE in the first frequency band and in the second frequency band and the downlink transmission in the first frequency band of the UE simultaneously, the base station may send configuration information to the UE.

Wherein, the configuration information may be carried in the broadcast signaling, the upper layer signaling, or the physical layer control signaling sent by the base station.

Optionally, in order to improve the accuracy of the base station in determining the interference, UE may report the its interference withstand capability information to the base station first, so as to make the base station determine whether the harmonic interference or the intermodulation interference exists between the uplink transmission and downlink transmission of the UE in the two frequency bands according to the interference withstand capability information and the information of the UE accessing the network.

In step S302, the interference coordination function is enabled according to the configuration information.

After receiving the configuration information, the UE may enable the interference coordination function according to the configuration information.

In the above embodiment, through the process of receiving the configuration information sent by the base station, and enabling the interference coordination function according to the configuration information, the condition for stopping sending the scheduling request in the corresponding time interval later is provided.

Figure 4:
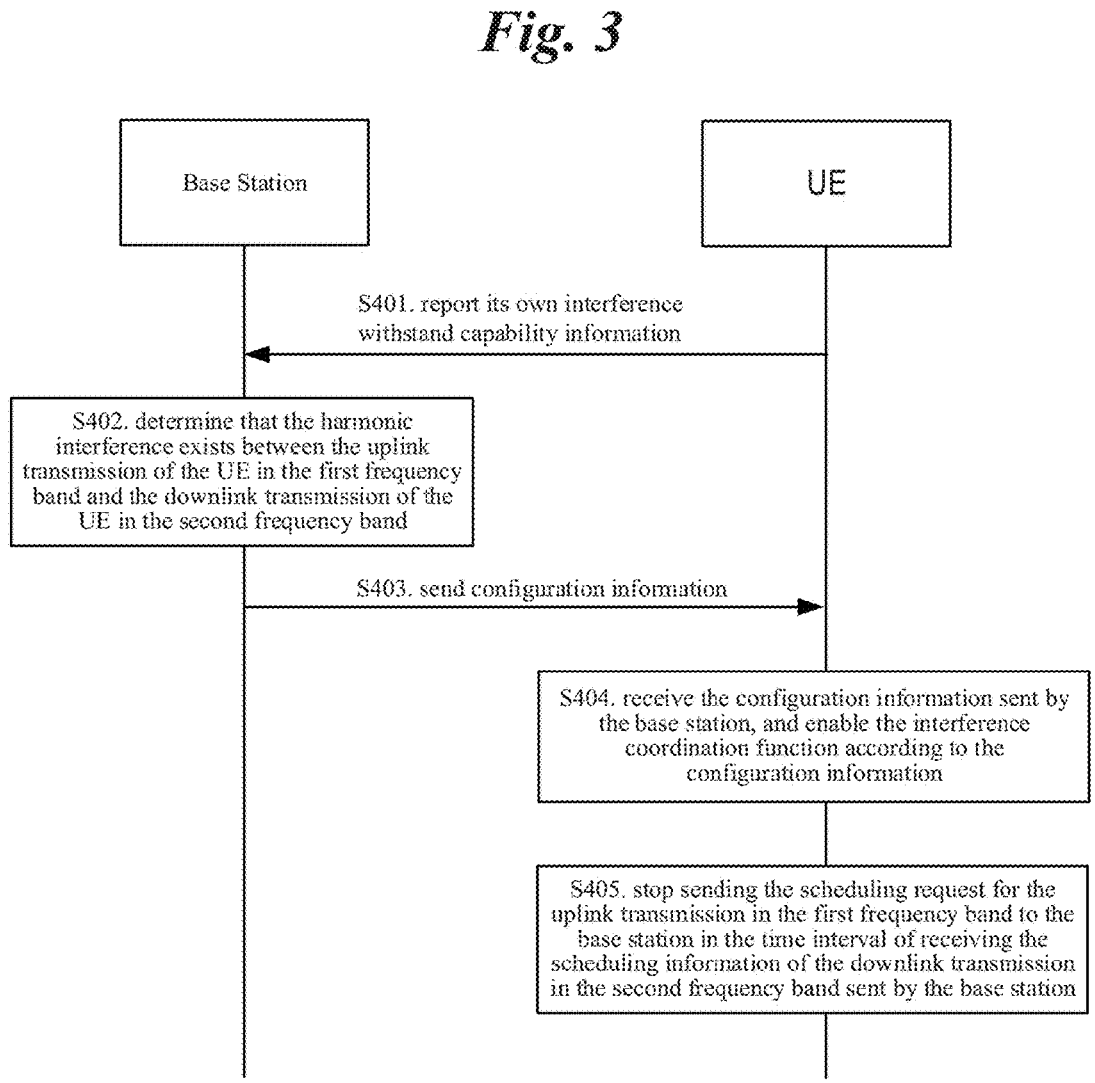
FIG. 4 is a signaling flowchart of an interference coordination method according to an exemplary embodiment of the present application.

FIG. 4 is a signaling flowchart of an interference coordination method according to an exemplary embodiment of the present application. The embodiment is described from the perspective of interaction between the base station and the UE. As shown in FIG. 4, the interference coordination method comprises:

In step S401, the UE reports its own interference withstand capability information to the base station.

In step S402, the base station receives the interference withstand capability information of the UE, and determines, according to the interference withstand capability information of the UE and the information of the UE accessing the network, that the harmonic interference exists between the uplink transmission of the UE in the first frequency band and the downlink transmission of the UE in the second frequency band.

In step S403, the base station sends configuration information to the UE, wherein the configuration information is used for instructing the UE to enable the interference coordination function.

In step S404, the UE receives the configuration information sent by the base station, and enables the interference coordination function according to the configuration information.

In step S405, the UE stops sending the scheduling request for the uplink transmission in the first frequency band to the base station in the time interval of receiving the scheduling information of the downlink transmission in the second frequency band sent by the base station.

In this embodiment, through the process of stopping sending the scheduling request for the uplink transmission in the first frequency band to the base station in the time interval of receiving the scheduling information of the downlink transmission in the second frequency band sent by the base station, the effect that the base station stops sending the uplink transmission scheduling information of the first frequency band to the UE in the time interval of sending the downlink transmission scheduling information of the second frequency band to the UE is achieved, thereby avoiding the harmonic interference.

In the above embodiment, the interaction between the base station and the UE is used for achieving the effect that the base station stops sending the uplink transmission scheduling information of the first frequency band to the UE in the time interval of sending the downlink transmission scheduling information of the second frequency band to the UE, thereby avoiding the harmonic interference.

Figure 5:
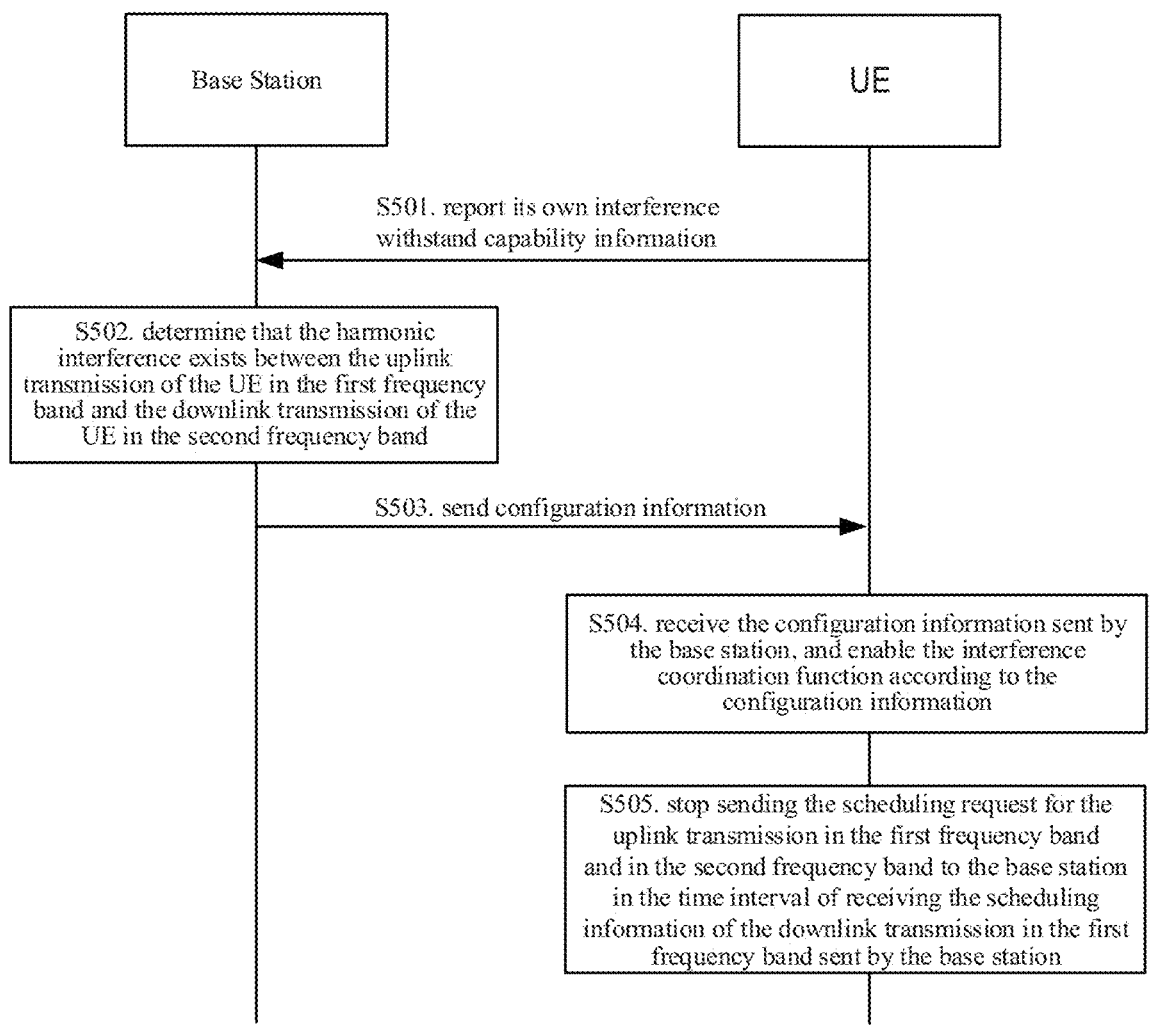
FIG. 5 is a signaling flowchart of another interference coordination method according to an exemplary embodiment of the present application.

FIG. 5 is a signaling flowchart of an interference coordination method according to an exemplary embodiment of the present application. The embodiment is described from the perspective of interaction between the base station and the UE. As shown in FIG. 5, the interference coordination method comprises:

In step S501, the UE reports its own interference withstand capability information to the base station.

In step S502, the base station receives the interference withstand capability information of the UE, and determines, according to the interference withstand capability information of the UE and the information of the UE accessing the network, that the harmonic interference exists between the uplink transmission of the UE in the first frequency band and the downlink transmission of the UE in the second frequency band.

In step S503, the base station sends configuration information to the UE, wherein the configuration information is used for instructing the UE to enable the interference coordination function.

In step S504, the UE receives the configuration information sent by the base station, and enables the interference coordination function according to the configuration information.

In step S505, the UE stops sending the scheduling request for the uplink transmission in the first frequency band and in the second frequency band to the base station in the time interval of receiving the scheduling information of the downlink transmission in the first frequency band sent by the base station.

In this embodiment, through the process that the UE stops sending the scheduling request for the uplink transmission in the first frequency band and in the second frequency band to the base station in the time interval of receiving the scheduling information of the downlink transmission in the first frequency band sent by the base station, the effect that the base station stops sending the uplink transmission scheduling information of the first frequency band and the second frequency band to the UE in the time interval of sending downlink transmission scheduling information of the first frequency band to the UE is achieved, thereby avoiding the intermodulation interference.

In the above embodiment, the interaction between the base station and the UE is used for achieving the effect that the base station stops sending the scheduling information used by the UE to send uplink transmission in the first frequency band and in the second frequency band to the UE in a time interval of sending downlink transmission scheduling information of the first frequency band to the UE is achieved, thereby avoiding the harmonic interference.

Figure 6:
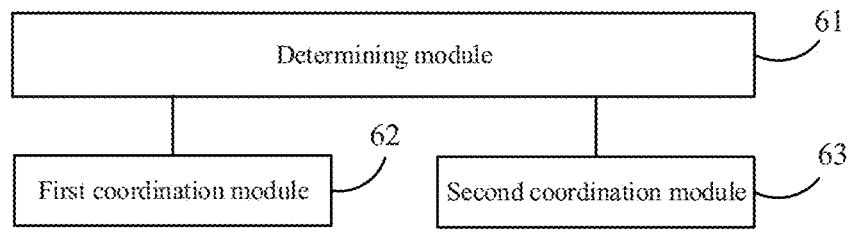
FIG. 6 is a block diagram of still another interference coordination apparatus according to an exemplary embodiment.

FIG. 6 is a block diagram of an interference coordination apparatus according to an exemplary embodiment, and the interference coordination apparatus may be located in the base station. As shown in FIG. 6, the interference coordination apparatus comprises: a determination module 61 and one of a first coordination module 62 and a second coordination module 63.

The determining module 61 is configured to whether intra-device interference exists between uplink transmission and downlink transmission of user equipment (UE) in two frequency bands.

In this embodiment, the base station may determine, according to the information of the UE accessing the network, whether intra-device interference exists between the uplink transmission and downlink transmission of the UE in the two frequency bands, wherein the intra-device interference may comprise harmonic interference and inter-modulation interference.

When an integer multiple of one frequency band at least partially overlaps another frequency band, harmonic interference may occur between the uplink transmission and downlink transmission of the two frequency bands.

Intermodulation interference (IM interference) means that when two or more interfering signals are simultaneously applied to the receiver, due to the nonlinear effect, the combined frequency of the two interferences will sometimes be exactly equal to or close to the useful signal frequency and pass through the receiver smoothly, forming the interference.

The first coordination module 62 is configured to stop sending the downlink transmission scheduling information of one frequency band to the UE, or send a blank subframe or an almost blank subframe to the UE in a time interval during which the UE is scheduled to send uplink transmission in at least one frequency band of the two frequency bands, if the determining module 61 determines that intra-device interference exists between the uplink transmission and downlink transmission of the UE in two frequency bands.

In this embodiment, if the base station determines that the intra-device interference exists between the uplink transmission and downlink transmission of the UE in two frequency bands, for example, the harmonic interference or intermodulation interference, the base station may stop sending downlink transmission scheduling information of one frequency band to the UE in a time interval during which the UE is scheduled to send uplink transmission in at least one frequency band of the two frequency bands, or send a blank subframe or an almost blank subframe to the UE in a time interval in which the UE is scheduled to send uplink transmission in at least one frequency band of the two frequency bands.

Wherein, the blank subframe is a subframe without any information transmission. The almost blank subframe (abbreviated as ABS) is a type of subframe that contains control information and reference signals and does not contain data information.

The second coordination module 63 is configured to stop sending the uplink transmission scheduling information of at least one frequency band in the two frequency bands to the UE in a time interval of sending downlink transmission scheduling information of one frequency band to the UE, if the determining module 61 determines that intra-device interference exists between the uplink transmission and downlink transmission of the UE in two frequency bands.

In this embodiment, if the base station determines that intra-device interference exists between the uplink transmission and downlink transmission of the UE in two frequency bands, for example, the harmonic interference or intermodulation interference, then the base station may stop sending the uplink transmission scheduling information of at least one frequency band in the two frequency bands to the UE in a time interval of sending downlink transmission scheduling information of one frequency band to the UE.

In the foregoing embodiment, after determining that intra-device interference exists between the uplink transmission and downlink transmission of the UE in two frequency bands, the objective for avoiding data channel interference in a device can be achieved by stopping sending downlink transmission scheduling information of one frequency band to the UE in a time interval during which the UE is scheduled to send uplink transmission in at least one frequency band of the two frequency bands, or by sending a blank subframe or an almost blank subframe to the UE in a time interval in which the UE is scheduled to send uplink transmission in at least one frequency band of the two frequency bands, or by stopping sending the uplink transmission scheduling information of at least one frequency band in the two frequency bands to the UE in a time interval of sending downlink transmission scheduling information of one frequency band to the UE.

Figure 7A:
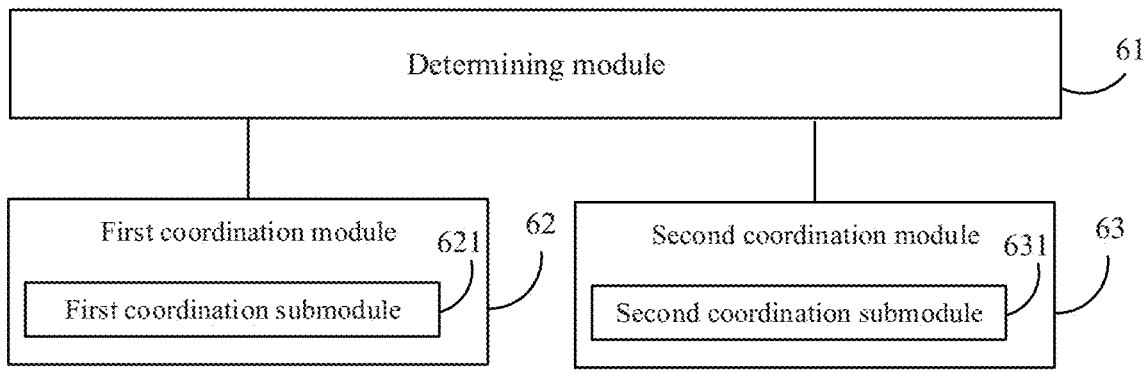
FIG. 7A is a block diagram of another interference coordination apparatus according to an exemplary embodiment.

FIG. 7A is a block diagram of another interference coordination apparatus according to an exemplary embodiment, as shown in FIG. 7A, based on the above embodiment shown in FIG. 6, the first coordination module 62 may comprise: a first coordination submodule 621.

The first coordination submodule 621 is configured to stop sending downlink transmission scheduling information of the second frequency band to the UE in a time interval during which the UE is scheduled to send uplink transmission in the first frequency band, if it is determined that the harmonic interference exists between the uplink transmission of the UE in the first frequency band and the downlink transmission of the UE in the second frequency band.

Assume that the first frequency band is the LTE frequency band and the second frequency band is the NR frequency band. As shown in FIG. 2B, the harmonic interference exists in the uplink transmission (UL) 21 of the UE in the LTE frequency band and the downlink transmission (DL) 22 of the UE in the NR frequency band. As shown in FIG. 2C, the intermodulation interference exists between the uplink transmission 24 of the UE in the LTE frequency band and the uplink transmission 25 of the UE in the NR frequency band and the downlink transmission 26 of the UE in the LTE frequency band simultaneously.

In this embodiment, after the base station determines that the harmonic interference exists between the uplink transmission of the UE in the first frequency band and the downlink transmission of the UE in the second frequency band, the base station may stop sending downlink transmission scheduling information of the second frequency band to the UE in a time interval during which the UE is scheduled to send uplink transmission in the first frequency band, or send a blank subframe or an almost blank subframe to the UE in a time interval in which the UE is scheduled to send uplink transmission in the first frequency band.

As shown in FIG. 2B, after the base station determines that the harmonic interference exists between the uplink transmission of the UE in the LTE frequency band and the downlink transmission of the UE in the NR frequency band, the base station may stop sending downlink transmission scheduling information of the NR frequency band to the UE in a time interval during which the UE is scheduled to send uplink transmission in the LTE frequency band, or send a blank subframe or an almost blank subframe to the UE in a time interval in which the UE is scheduled to send uplink transmission of the LTE frequency band, so as to avoid the harmonic interference.

The second coordination module 63 may comprise: a second coordination submodule 631.

The second coordination submodule 631 is configured to stop sending the uplink transmission scheduling information of the first frequency band to the UE in a time interval of sending downlink transmission scheduling information of the second frequency band to the UE.

Wherein, the first frequency band may belong to the LTE frequency band, and the second frequency band may belong to the NR frequency band. In addition, the first frequency band and the second frequency band may also belong to two frequency bands in the NR.

In this embodiment, after the base station determines that the harmonic interference exists between the uplink transmission of the UE in the first frequency band and the downlink transmission of the UE in the second frequency band, the base station may stop sending the uplink transmission scheduling information of the first frequency band to the UE in a time interval of sending downlink transmission scheduling information of the second frequency band to the UE.

As shown in FIG. 2B, after the base station determines that the harmonic interference exists between the uplink transmission of the UE in the LTE frequency band and the downlink transmission of the UE in the NR frequency band, the base station may stop sending the uplink transmission scheduling information of the LTE frequency band to the UE in a time interval of sending downlink transmission scheduling information of the NR frequency band to the UE, so as to avoid the harmonic interference.

In the above embodiment, after the base station determines that the harmonic interference exists between the uplink transmission of the UE in the first frequency band and the downlink transmission of the UE in the second frequency band, the base station may stop sending downlink transmission scheduling information of the second frequency band to the UE in a time interval during which the UE is scheduled to send uplink transmission in the first frequency band, or sending a blank subframe or an almost blank subframe to the UE in a time interval in which the UE is scheduled to send uplink transmission in the first frequency band, or stopping sending the uplink transmission scheduling information of the first frequency band to the UE in a time interval of sending downlink transmission scheduling information of the second frequency band to the UE, so as to achieve the object for avoiding harmonic interference by utilizing coordinated scheduling between uplink and downlink transmissions.

Figure 7B:
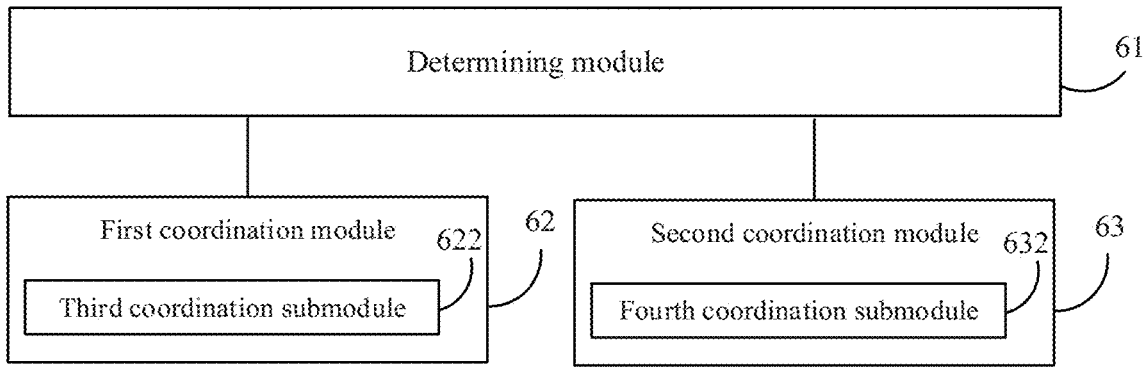
FIG. 7B is a block diagram of another interference coordination apparatus according to an exemplary embodiment.

FIG. 7B is a block diagram of another interference coordination apparatus according to an exemplary embodiment, As shown in FIG. 7B, based on the foregoing embodiment shown in FIG. 6, the first coordination module 62 may comprise: a third coordination submodule 622.

The third coordination submodule 622 is configured to stop sending downlink transmission scheduling information of the first frequency band to the UE in a time interval during which the UE is scheduled to send uplink transmission in the first frequency band and in the second frequency band simultaneously, after determining that the intermodulation interference exists between the uplink transmission of the UE both in the first frequency band and in the second frequency band and the downlink transmission of the UE in the first frequency band simultaneously.

In this embodiment, after the base station determines that the intermodulation interference exists between the uplink transmission of the UE both in the first frequency band and in the second frequency band and the downlink transmission of the UE in the first frequency band at the same time, the base station may stop sending downlink transmission scheduling information of the first frequency band to the UE or sending a blank subframe or an almost blank subframe to the UE in a time interval during which the UE is scheduled to send uplink transmission in the first frequency band and in the second frequency band at the same time, so as to avoid the intermodulation interference.

As shown in FIG. 2C, after the base station determines that the intermodulation interference exists between the uplink transmission of the UE both in the LTE frequency band and in the NR frequency band and the downlink transmission of the UE in the LTE frequency band at the same time, the base station may stop sending downlink transmission scheduling information of the LTE frequency band to the UE in a time interval during which the UE is scheduled to send uplink transmission in the LTE frequency band and in the NR frequency band, or send a blank subframe or an almost blank subframe to the UE in a time interval in which the UE is scheduled to send uplink transmission of the LTE frequency band and the NR frequency band at the same time, so as to avoid the intermodulation interference.

The second coordination module 63 may comprise: a fourth coordination submodule 632.

The fourth coordination submodule 632 is configured to stop sending the scheduling information used by the UE to send uplink transmission in the first frequency band and in the second frequency band to the UE in a time interval of sending downlink transmission scheduling information of the first frequency band to the UE.

In this embodiment, after the base station determines that the intermodulation interference exists between the uplink transmission of the UE both in the first frequency band and in the second frequency band at the same time and the downlink transmission of the UE in the first frequency band, the base station may stop sending the scheduling information used by the UE to send uplink transmission in the first frequency band and in the second frequency band to the UE at the same time in a time interval of sending downlink transmission scheduling information of the first frequency band to the UE, so as to avoid the intermodulation interference.

As shown in FIG. 2C, after the base station determines that the intermodulation interference exists between the uplink transmission of the UE both in the LTE frequency band and in the NR frequency band at the same time and the downlink transmission of the UE in the LTE frequency band, the base station may stop sending the scheduling information used by the UE to send uplink transmission in the LTE frequency band and in the NR frequency band to the UE at the same time in a time interval of sending downlink transmission scheduling information of the LTE frequency band to the UE, so as to avoid the intermodulation interference.

In this embodiment, after the base station determines that the intermodulation interference exists between the uplink transmission of the UE both in the first frequency band and in the second frequency band and the downlink transmission of the UE in the first frequency band simultaneously, stopping sending downlink transmission scheduling information of the first frequency band to the UE in a time interval during which the UE is scheduled to send uplink transmission in the first frequency band and the send frequency band simultaneously, or sending a blank subframe or an almost blank subframe to the UE in a time interval in which the UE is scheduled to send uplink transmission in the first frequency band and in the second frequency band simultaneously, or stopping sending the uplink transmission scheduling information of the first frequency band and the second frequency band to the UE in a time interval of sending downlink transmission scheduling information of the first frequency band to the UE, so as to achieve the object for avoiding intermodulation interference by utilizing coordinated scheduling between uplink and downlink transmissions.

Figure 8A:
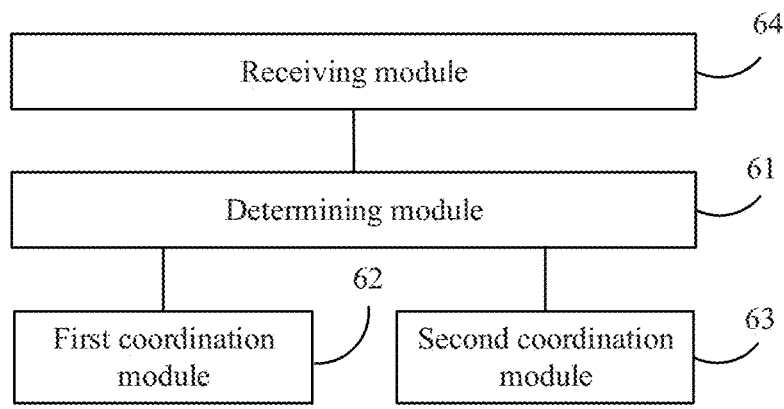
FIG. 8A is a block diagram of another interference coordination apparatus according to an exemplary embodiment.

FIG. 8A is a block diagram of another interference coordination apparatus according to an exemplary embodiment, As shown in FIG. 8A, on the basis of the foregoing embodiment shown in FIG. 6, the apparatus may further comprise: a receiving module 64.

The receiving module 64 is configured to receive the interference withstand capability information reported by the UE before the determining module 61 determines whether intra-device interference exists between uplink transmission and downlink transmission of the UE in two frequency bands.

The determining module 61 is configured to determine, according to the interference withstand capability information received by the receiving module 64 and the information of the UE accessing the network, whether intra-device interference exists between uplink transmission and downlink transmission of the UE in two frequency bands.

In this embodiment, the base station may determine, according to the information of the UE accessing the network, whether the harmonic interference or intermodulation interference exists between the uplink transmission and downlink transmission of a UE in the two frequency bands. In order to improve the accuracy of the determining, it is also possible to receive the interference withstand capability information reported by the UE at first, and then determine whether the harmonic interference or the intermodulation interference exists between the uplink transmission and downlink transmission of the UE in the two frequency bands according to the interference withstand capability information and the information of the UE accessing the network.

Wherein, the first frequency band may belong to the LTE frequency band, and the second frequency band may belong to the NR frequency band. In addition, the first frequency band and the second frequency band may also belong to two frequency bands in the NR.

Assume that the first frequency band is the LTE frequency band and the second frequency band is the NR frequency band. As shown in FIG. 2B, the harmonic interference exists in the uplink transmission (UL) 21 of the UE in the LTE frequency band and the downlink transmission (DL) 22 of the UE in the NR frequency band. As shown in FIG. 2C, the intermodulation interference exists between the uplink transmission 24 of the UE in the LTE frequency band and the uplink transmission 25 of the UE in the NR frequency band and the downlink transmission 26 of the UE in the LTE frequency band simultaneously.

In the above embodiment, it is possible to determine whether the harmonic interference or the intermodulation interference exists between the uplink transmission and downlink transmission of the UE in the two frequency bands according to the interference withstand capability information and the information of the UE accessing the network by receiving the interference withstand capability information reported by the UE, so as to improve the accuracy of the determining the interference.

Figure 8B:
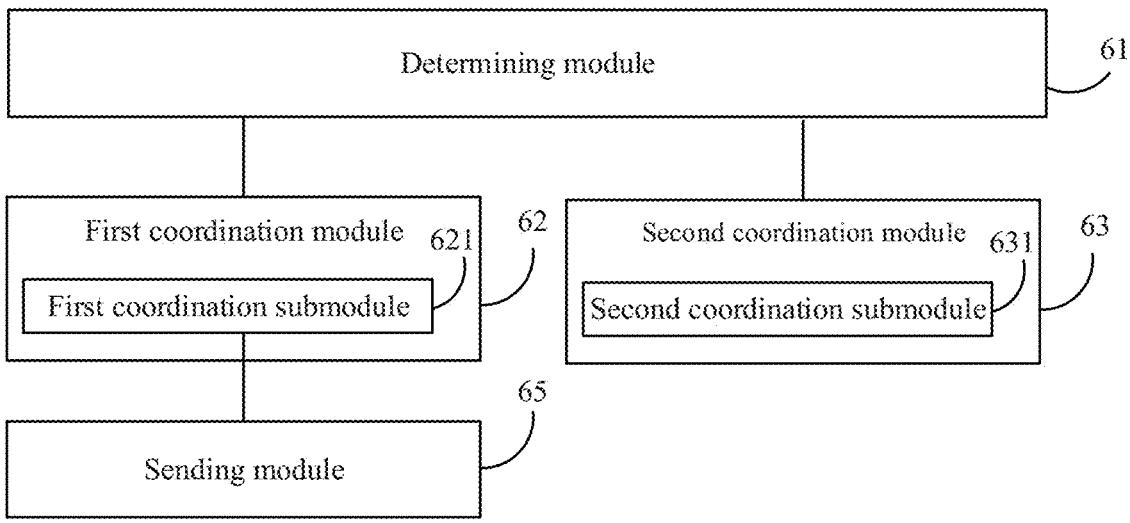
FIG. 8B is a block diagram of another interference coordination apparatus according to an exemplary embodiment.
Figure 8C:
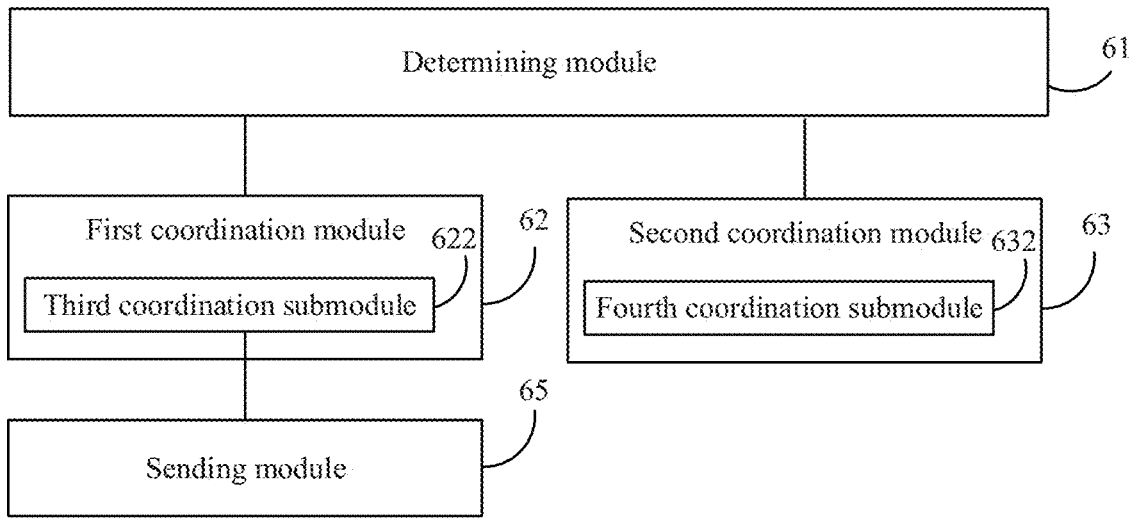
FIG. 8C is a block diagram of another interference coordination apparatus according to an exemplary embodiment.

FIG. 8B is a block diagram of another interference coordination apparatus according to an exemplary embodiment, As shown in FIG. 8B, on the basis of the embodiment shown in FIG. 7A, the apparatus may further comprise: a sending module 65. FIG. 8C is a block diagram of another interference coordination apparatus according to an exemplary embodiment, As shown in FIG. 8C, on the basis of the embodiment shown in FIG. 7B, the apparatus may further comprise: the sending module 65.

The sending module 65 is configured to send to the UE the configuration information used for instructing the UE to enable the interference coordination function, after the first coordination submodule 621 determines that the harmonic interference exists between the uplink transmission of the UE in the first frequency band and the downlink transmission of the UE in the second frequency band or the third coordination submodule 622 determines that the intermodulation interference exists between the uplink transmission of the UE in the first frequency band and in the second frequency band and the downlink transmission in the first frequency band of the UE simultaneously.

In an embodiment, the second coordination submodule 631 may be configured to receive the scheduling request for uplink transmission in the first frequency band sent by the UE, and send the uplink transmission scheduling information of the first frequency band, after sending the downlink transmission scheduling information of the second frequency band to the UE.

In this embodiment, if the base station receives the scheduling request for the uplink transmission in the first frequency band that is sent by the UE, then the base station may send the uplink transmission scheduling information of the first frequency band to the UE, after sending the downlink transmission scheduling information of the second frequency band to the UE, so as to realize the effect that the base station stops sending the uplink transmission scheduling information of the first frequency band to the UE in the time interval of sending the downlink transmission scheduling information of the second frequency band to the UE.

In an embodiment, the fourth coordination submodule 632 may be configured to receive the scheduling request for uplink transmission in the first frequency band and in the second frequency sent by the UE, and send the uplink transmission scheduling information of the first frequency band and the second frequency band, after sending the downlink transmission scheduling information of the first frequency band to the UE.

In this embodiment, if the base station receives the scheduling request for the uplink transmission in the first frequency band and in the second frequency band that is sent by the UE, then the base station may send the uplink transmission scheduling information of the first frequency band and the second frequency band to the UE, after sending the downlink transmission scheduling information of the first frequency band to the UE, so as to realize the effect that the base station stops sending the scheduling information used by the UE to send uplink transmission in the first frequency band and in the second frequency band to the UE simultaneously in a time interval of sending downlink transmission scheduling information of the first frequency band to the UE.

In the above embodiment, through the process of sending the scheduling request for the uplink transmission in the first frequency band to the UE after sending the scheduling request for the downlink transmission in the second frequency band to the UE, the effect that the base station stops sending the uplink transmission scheduling information of the first frequency band to the UE in the time interval of sending the downlink transmission scheduling information of the second frequency band to the UE is realized, thereby avoiding the harmonic interference. In the above embodiment, through the process of sending the scheduling request for the uplink transmission in the first frequency band and in the second frequency band to the UE after sending the scheduling request for the downlink transmission in the first frequency band to the UE, the effect that the base station stops sending the scheduling information used by the UE to send uplink transmission in the first frequency band and in the second frequency band to the UE simultaneously in a time interval of sending downlink transmission scheduling information of the first frequency band to the UE is realized, thereby avoiding the harmonic interference.

Figure 9:
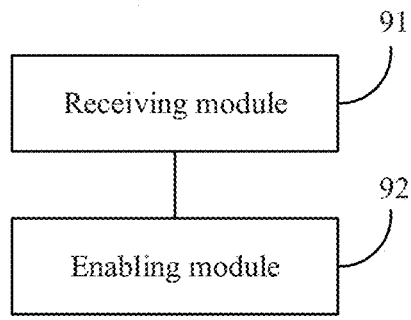
FIG. 9 is a block diagram of still another interference coordination apparatus according to an exemplary embodiment.

FIG. 9 is a block diagram of still another interference coordination apparatus according to an exemplary embodiment, and the interference coordination apparatus may be located in the UE. As shown in FIG. 9, the interference coordination apparatus comprises: a receiving module 91 and an enabling module 92.

The receiving module 91 is configured to receive the configuration information sent by the base station, wherein the configuration information is sent after the base station determines that the harmonic interference exists between the uplink transmission of the UE in the first frequency band and the downlink transmission of the UE in the second frequency band or that the intermodulation interference exists between the uplink transmission of the UE in the first frequency band and in the second frequency band and the downlink transmission in the first frequency band of the UE simultaneously.

The enabling module 92 is configured to enable the interference coordination function according to the configuration information received by the receiving module 91.

In this embodiment, after the base station determines that the harmonic interference exists between the uplink transmission of the UE in the first frequency band and the downlink transmission of the UE in the second frequency band or that the intermodulation interference exists between the uplink transmission of the UE in the first frequency band and in the second frequency band and the downlink transmission in the first frequency band of the UE simultaneously, the base station may send configuration information to the UE.

Wherein, the configuration information may be carried in the broadcast signaling, the upper layer signaling, or the physical layer control signaling sent by the base station.

In the above embodiment, through the process of receiving the configuration information sent by the base station, and enabling the interference coordination function according to the configuration information, the condition for stopping sending the scheduling request in the corresponding time interval later is provided.

Figure 10A:
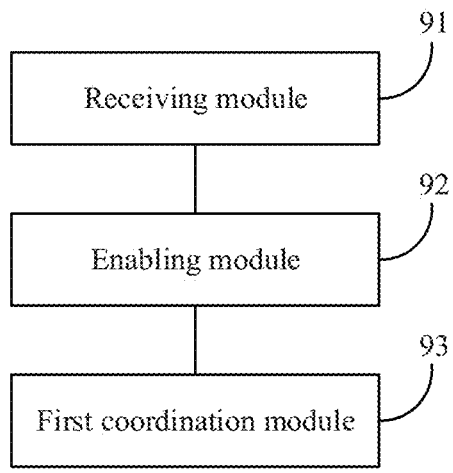
FIG. 10A is a block diagram of still another interference coordination apparatus according to an exemplary embodiment; FIG.

FIG. 10A is a block diagram of still another interference coordination apparatus according to an exemplary embodiment, As shown in FIG. 10A, on the basis of the above embodiment shown in FIG. 9, the apparatus may further comprise: a first coordination module 93.

The first coordination module 93 is configured to stop sending the scheduling request for the uplink transmission in the first frequency band to the base station in the time interval of receiving the scheduling information of the downlink transmission in the second frequency band sent by the base station, after the enabling module 92 enables the interference coordination function according to the configuration information.

In the above embodiment, through the process of stopping sending the scheduling request for the uplink transmission in the first frequency band to the base station in the time interval of receiving the scheduling information of the downlink transmission in the second frequency band sent by the base station the effect that the base station stops sending the uplink transmission scheduling information of the first frequency band to the UE in the time interval of sending the downlink transmission scheduling information of the second frequency band to the UE is realized, thereby avoiding the harmonic interference.

Figure 10B:
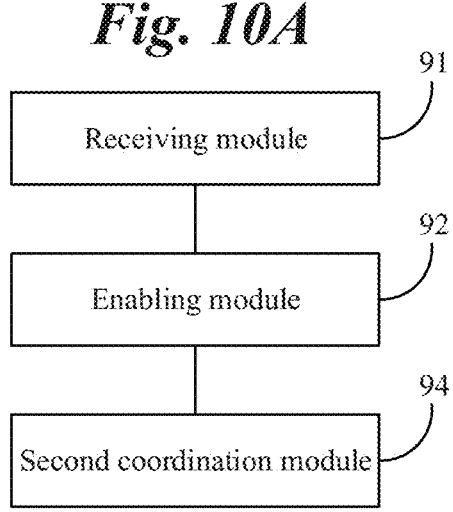
FIG. 10B is a block diagram of still another interference coordination apparatus according to an exemplary embodiment.

FIG. 10B is a block diagram of still another interference coordination apparatus according to an exemplary embodiment, As shown in FIG. 10B, on the basis of the embodiment shown in FIG. 9, the apparatus may further comprise: a second coordination module 94.

After the second coordination module 94 is configured to stop sending the scheduling request for the uplink transmission in the first frequency band and in the second first frequency band to the base station in the time interval of receiving the scheduling information of the downlink transmission in the first frequency band sent by the base station, after the enabling module 92 enables the interference coordination function according to the configuration information.

In the above embodiment, through the process of stopping sending the scheduling request for the uplink transmission in the first frequency band and in the second frequency band to the base station in the time interval of receiving the scheduling information of the downlink transmission in the first frequency band sent by the base station, the effect that the base station stops sending the scheduling information used by the UE to send uplink transmission in the first frequency band and in the second frequency band to the UE simultaneously in a time interval of sending downlink transmission scheduling information of the first frequency band to the UE is realized, thereby avoiding the intermodulation interference.

Figure 10C:
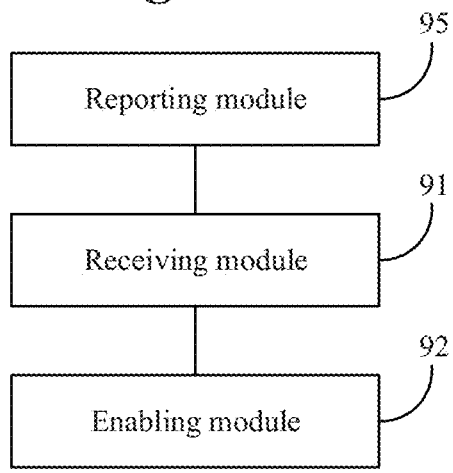
FIG. 10C is a block diagram of still another interference coordination apparatus according to an exemplary embodiment.

FIG. 10C is a block diagram of still another interference coordination apparatus according to an exemplary embodiment, as shown in FIG. 10C, on the basis of the embodiment shown in FIG. 9, the apparatus may further comprise: a reporting module 95.

The reporting module 95 is configured to report the interference withstand capability information of the UE to the base station before the receiving module 91 receives the configuration information sent by the base station, so that the base station determines whether the harmonic interference or the intermodulation interference exists according to the interference withstand capability information and the information of the UE accessing the network.

In the above embodiment, by reporting its own interference withstand capability information to the base station, it is possible for the base station to determine whether the intra-device interference like the harmonic interference or the intermodulation interference exists between the uplink transmission and downlink transmission of the UE in the two frequency bands according to the interference withstand capability information and the information of the UE accessing the network, so as to improve the accuracy of the determining the interference.

Figure 11:
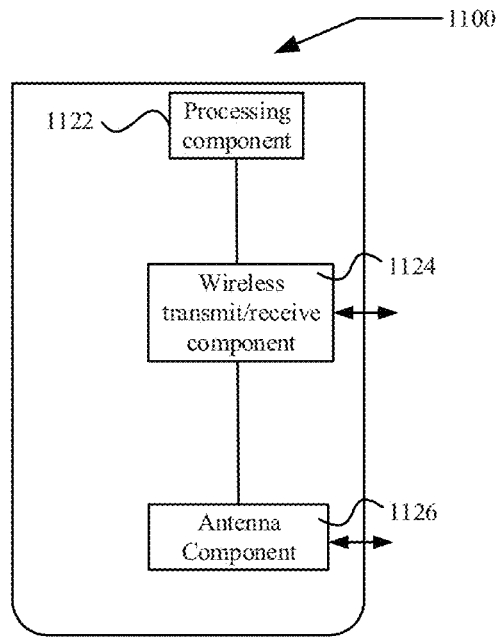
FIG. 11 is a block diagram of an apparatus suitable for interference coordination, according to an exemplary embodiment.

FIG. 11 is a block diagram of an apparatus suitable for interference coordination, according to an exemplary embodiment. A device 1100 can be provided as a base station. Referring to FIG. 11, the device 1100 includes a processing component 1122, a wireless transmit/receive component 1124, an antenna component 1126, and a signal processing portion specific to the wireless interface, the processing component 1122 can further comprise one or more processors.

One of the processors in the processing component 1122 can be configured to:

determines whether intra-device interference exists between uplink transmission and downlink transmission of user equipment (UE) in two frequency bands:

if it is determined that intra-device interference exists between the uplink transmission and downlink transmission of the UE in two frequency bands, then stopping sending downlink transmission scheduling information of one frequency band to the UE or sending a blank subframe or an almost blank subframe to the UE; or stopping sending the uplink transmission scheduling information of at least one frequency band in the two frequency bands to the UE in a time interval of sending downlink transmission scheduling information of one frequency band to the UE.

Figure 12:
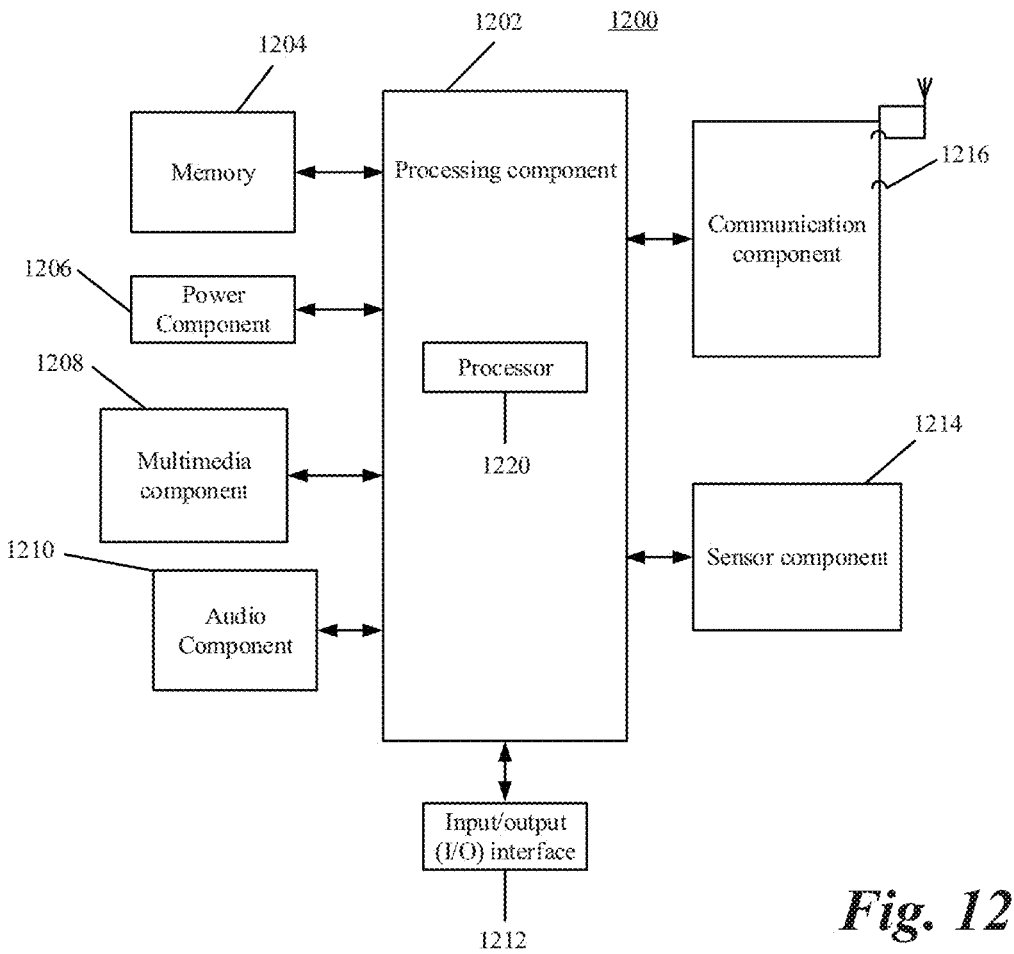
FIG. 12 is a block diagram of another apparatus suitable for interference coordination, according to an exemplary embodiment.

FIG. 12 is a block diagram of another apparatus suitable for interference coordination, according to an exemplary embodiment. For example, a device 1200 can be a user device such as a mobile phone, computer, digital broadcast terminal, messaging device, game console, tablet device, medical device, fitness device, personal digital assistant, and the like.

Referring to FIG. 12, the device 1200 may comprise one or more of the following components: a processing component 1202, a memory 1204, a power component 1206, a multimedia component 1208, an audio component 1210, an input/output (I/O) interface 1212, a sensor component 1214, and a communication component 1216.

The processing component 1202 typically controls the overall operation of the device 1200, such as operations associated with display, telephone calls, data communications, camera operations, and recording operations. The processing component 1202 may include one or more processors 1220 to execute instructions to perform all or part of the steps of the above described methods. Moreover, the processing component 1202 may comprise one or more modules to facilitate interaction between the component 1202 and other components. For example, the processing component 1202 may comprise a multimedia module to facilitate interaction between the multimedia component 1208 and the processing component 1202.

The memory 1204 is configured to store various types of data to support operation at the device 1200. Examples of such data comprise instructions for any application or method operating on the device 1200, contact data, phone book data, messages, pictures, videos, and the like. The memory 1204 can be implemented by any type of volatile or non-volatile storage device or a combination thereof, such as Static Random Access Memory (SRAM), Electrically Erasable Programmable Read Only Memory (EEPROM), Erasable Programmable Read Only Memory (EPROM), Programmable Read Only Memory (PROM). Read Only Memory (ROM), Magnetic Memory, Flash Memory. Magnetic Disk or Optical Disk.

The power component 1206 provides power to various components of device 1200. The power component 1206 may comprise a power management system, one or more power sources, and other components associated with generating, managing, and distributing power for the device 1200.

The multimedia component 1208 comprises a screen between the device 1200 and the user that provides an output interface. In some embodiments, the screen may comprise a Liquid Crystal Display (LCD) and a Touch Panel (TP). If the screen comprises a touch panel, the screen can be implemented as a touch screen to receive input signals from the user. The touch panel comprises one or more touch sensors to sense touches, slides, and gestures on the touch panel. The touch sensor can sense not only the boundaries of the touch or sliding action, but also the duration and pressure associated with the touch or slide operation. In some embodiments, the multimedia component 1208 comprises a front camera and/or a rear camera. When the device 1200 is in an operation mode, such as a shooting mode or a video mode, the front camera and/or the rear camera can receive external multimedia data. Each front and rear camera can be a fixed optical lens system or have focal length and optical zoom capabilities.

The audio component 1210 is configured to output and/or input an audio signal. For example, the audio component 1210 comprises a microphone (MIC) that is configured to receive an external audio signal when the device 1200 is in an operational mode, such as a call mode, a recording mode, and a voice recognition mode. The received audio signal may be further stored in the memory 1204 or sent via the communication component 1216. In some embodiments, the audio component 1210 also comprises a speaker for outputting an audio signal.

The I/O interface 1212 provides an interface between the processing component 1202 and the peripheral interface module, which may be a keyboard, a click wheel, a button, or the like. These buttons may include, but are not limited to, a home button, a volume button, a start button, and a lock button.

The sensor assembly 1214 comprises one or more sensors for providing status assessment of various aspects to the device 1200. For example, the sensor component 1214 can detect an open/closed state of the device 1200, a relative positioning of components, such as a display and a keypad of the device 1200, and the sensor component 1214 can also detect a change in position of a component of the device 1200 or the device 120X), the presence or absence of contact between user and the device 1200, the orientation or acceleration/deceleration of the device 1200 and the temperature change of the device 1200. The sensor assembly 1214 may comprise a proximity sensor configured to detect the presence of nearby objects without any physical contact. The sensor assembly 1214 may also comprise a light sensor, such as a CMOS or CCD image sensor, for use in imaging applications. In some embodiments, the sensor assembly 1214 may also comprise an acceleration sensor, a gyro sensor, a magnetic sensor, a pressure sensor, or a temperature sensor.

The communication component 1216 is configured to facilitate wired or wireless communication between the device 1200 and other devices. The device 1200 can access a wireless network based on a communication standard, such as WiFi, 2G or 3G, or a combination thereof. In an exemplary embodiment, the communication component 1216 receives broadcast signals or broadcast associated information from an external broadcast management system via a broadcast channel. In an exemplary embodiment, the communication component 1216 also includes a near field communication (NFC) module to facilitate short range communication. For example, the NFC module can be implemented based on Radio Frequency Identification (RFID) technology, Infrared Data Association (IrDA) technology, Ultra-wideband (UWB) technology, Bluetooth (BT) technology, and other technologies.

In an exemplary embodiment, the device 1200 may be one or more application specific integrated circuits (ASICs), digital signal processors (DSPs), digital signal processing devices (DSPDs), programmable logic devices (PLDs), field programmable gate array (FPGA), controllers, microcontrollers, microprocessors, or other electronic components used for performing the above methods.

In an exemplary embodiment, there is also provided a non-transitory computer readable storage medium comprising instructions, such as the memory 1204 comprising instructions executable by the processor 1220 of the device 1200 to perform the above method. For example, the non-transitory computer readable storage medium may be a ROM, a random access memory (RAM), a CD-ROM, a magnetic tape, a floppy disk, and an optical data storage apparatus.

For the embodiment of the device, since it basically corresponds to the embodiment of the method, reference may be made to the partial description of the embodiment of the method. The embodiments of the device described above are merely illustrative, wherein the units described as separate components may or may not be physically separated, and the components displayed as units may or may not be physical units, it may be located a place, or it can be distributed to multiple network units. Some or all of the modules may be selected according to actual needs to achieve the purpose of the solution of the embodiment. Those of ordinary skill in the art can understand and implement without any creative effort.

It should be noted that, in this context, relational terms such as first and second are used merely to distinguish one entity or operation from another entity or operation, and do not necessarily require or imply that there is any such actual relationship or order between these entities or operations. The terms "including", "comprising" or any other variation thereof are intended to include a non-exclusive inclusion, such that a process, method, article, or device that comprises a plurality of elements includes not only those elements but also other elements not specifically listed, or elements that are inherent to such a process, method, item, or device. An element that is defined by the phrase "comprising a . . . " does not exclude the presence of additional equivalent elements in the process, method, item, or device that comprises the element.

Other embodiments of the present disclosure will be readily apparent to those skilled in the art. The present application is intended to cover any variations, uses, or adaptations of the present disclosure, which are in accordance with the general principles of the disclosure and include common general knowledge or common technical means in the art that are not disclosed in the present disclosure. The specification and embodiments are deemed to be exemplary only and the true scope and spirit of this disclosure is indicated by the claims below.

It should be understood that this disclosure is not limited to the exact structure described above and shown in the accompanying drawings, and can be subject to various modifications and changes without deviating from its scope. The scope of the disclosure is to be limited only by the appended claims.

What is claimed is:

1. An interference coordination method, wherein the method comprises:
   determining whether intra-device interference exists between uplink transmission and downlink transmission of user equipment (UE) in two frequency bands; and
   if it is determined that intra-device interference exists between the uplink transmission and downlink transmission of the UE in two frequency bands, performing at least one of:
      stopping sending downlink transmission scheduling information of one frequency band to the UE, or sending a blank subframe or an almost blank subframe to the UE, in a time interval during which the UE is scheduled to send uplink transmission in at least one frequency band of the two frequency bands; or
      stopping sending uplink transmission scheduling information of at least one frequency band in the two frequency bands to the UE in a time interval of sending downlink transmission scheduling information of one frequency band to the UE.

2. The method of claim 1, wherein if it is determined that intra-device interference exists between the uplink transmission and downlink transmission of the UE in two frequency bands, stopping sending downlink transmission scheduling information of one frequency band to the UE in a time interval during which the UE is scheduled to send uplink transmission in at least one frequency band of the two frequency bands, comprises:
   stopping sending downlink transmission scheduling information of a second frequency band to the UE in a time interval during which the UE is scheduled to send uplink transmission in a first frequency band, if it is determined that a harmonic interference exists between the uplink transmission of the UE in the first frequency band and the downlink transmission of the UE in the second frequency band.

3. The method of claim 2, wherein the stopping sending the uplink transmission scheduling information of at least one frequency band in the two frequency bands to the UE in the time interval of sending downlink transmission scheduling information of one frequency band to the UE, comprises:
   stopping sending the uplink transmission scheduling information of the first frequency band to the UE in a time interval of sending downlink transmission scheduling information of the second frequency band to the UE.

4. The method of claim 2, wherein the method further comprises:
   sending configuration information to the UE, after determining that a harmonic interference exists between the uplink transmission of the UE in the first frequency band and the downlink transmission of the UE in the second frequency band or that an intermodulation interference exists between the uplink transmission of the UE in the first frequency band and in the second frequency band and the downlink transmission in the first frequency band of the UE simultaneously, wherein the configuration information is configured to instruct the UE to enable an interference coordination function.

5. The method of claim 4, wherein the stopping sending the uplink transmission scheduling information of the first frequency band to the UE in the time interval of sending downlink transmission scheduling information of the second frequency band to the UE, comprises:

receiving a scheduling request for uplink transmission in the first frequency band sent by the UE, and sending the uplink transmission scheduling information of the first frequency band, after sending the downlink transmission scheduling information of the second frequency band to the UE.

6. The method of claim 4, wherein the stopping sending the scheduling information used by the UE to send uplink transmission in the first frequency band and in the second frequency band to the UE in the time interval of sending downlink transmission scheduling information of the first frequency band to the UE, comprises:
receiving a scheduling request for uplink transmission in the first frequency band and in the second frequency band sent by the UE, and sending the uplink transmission scheduling information of the first frequency band and the second frequency band, after sending the downlink transmission scheduling information of the first frequency band to the UE.

7. The method of claim 4, wherein the configuration information is carried in broadcast signaling, upper layer signaling, or physical layer control signaling sent by the base station.

8. The method of claim 2, wherein the first frequency band belongs to a long term evolution (LTE) frequency band, and the second frequency band belongs to a new radio (NR) frequency band; or
the first frequency band and the second frequency band belong to two frequency bands in the NR.

9. The method of claim 1, wherein if it is determined that intra-device interference exists between the uplink transmission and downlink transmission of the UE in two frequency bands, the stopping sending downlink transmission scheduling information of one frequency band to the UE in a time interval during which the UE is scheduled to send uplink transmission in at least one frequency band of the two frequency bands, comprises:
stopping sending downlink transmission scheduling information of a first frequency band to the UE in a time interval during which the UE is scheduled to send uplink transmission in the first frequency band and in a second frequency band simultaneously, after determining that an intermodulation interference exists between the uplink transmission of the UE both in the first frequency band and in the second frequency band and the downlink transmission of the UE in the first frequency band simultaneously.

10. The method of claim 9, wherein the stopping sending the uplink transmission scheduling information of at least one frequency band in the two frequency bands to the UE in the time interval of sending downlink transmission scheduling information of one frequency band to the UE, comprises:
stopping sending the scheduling information used by the UE to simultaneously send uplink transmission in the first frequency band and in the second frequency band to the UE in a time interval of sending downlink transmission scheduling information of the first frequency band to the UE.

11. The method of claim 1, wherein the method further comprises:
receiving the interference withstand capability information reported by the UE before determining whether intra-device interference exists between uplink transmission and downlink transmission of the UE in two frequency bands;
the determining whether intra-device interference exists between uplink transmission and downlink transmission of the UE in two frequency bands comprising:
determining, according to the interference withstand capability information received and the information of the UE accessing the network, whether intra-device interference exists between uplink transmission and downlink transmission of the UE in two frequency bands.

12. A base station, comprising:
a processor; and
a memory storing instructions executable by the processor;
wherein the processor is configured to:
determine whether intra-device interference exists between uplink transmission and downlink transmission of user equipment (UE) in two frequency bands; and
if it is determined that intra-device interference exists between the uplink transmission and downlink transmission of the UE in two frequency bands, perform at least one of:
stopping sending downlink transmission scheduling information of one frequency band to the UE, or sending a blank subframe or an almost blank subframe to the UE, in a time interval during which the UE is scheduled to send uplink transmission in at least one frequency band of the two frequency bands; or
stopping sending uplink transmission scheduling information of at least one frequency band in the two frequency bands to the UE in a time interval of sending downlink transmission scheduling information of one frequency band to the UE.

* * * * *